Patented Jan. 16, 1940

2,187,338

UNITED STATES PATENT OFFICE 2,187,338

SECONDARY ALKYL MONOSULPHONATES

James Herbert Werntz, Wilmington, Del., assignor to E. I. du Pont de Nemours & Company, Wilmington, Del., a corporation of Delaware No Drawing. Application June 8, 1938,
Serial No. 212,511

5 Claims. (Cl. 260—513)

This invention relates to new chemical compounds and still more specifically to water-soluble, acid-stable capillary active bodies comprising true secondary monosulphonates. In a more specific form, it relates to secondary alkyl monosulphonates containing 17 carbon atoms having the general formula

in which R and R' are saturated aliphatic hydrocarbon radicals and X represents a sulphonate group.

This invention has as an object the preparation of a number of new chemical compounds which have surface active properties. A further object is to manufacture these new compounds by novel and easily conducted processes which give high yields of relatively high quality products. A still further object is to apply these new compounds in various connections wherein surface active compounds are commonly employed. Other objects will appear hereinafter.

The following examples illustrate but do not limit the invention. All parts are given by weight.

EXAMPLE 1

*Sodium 3,9-diethyl-6-tridecanesulphonate*

Thirty parts of 3,9-diethyl-6-tridecanethiol of 87% purity was dissolved in 237 parts of carbon tetrachloride and placed in a flask equipped with a stirrer, thermometer and two dropping funnels. The reaction mixture was heated to the reflux temperature and 42.5 parts of nitric acid of specific gravity 1.42 was added slowly. After all the nitric acid had been added, 55 parts of 3,9-diethyl-6-tridecanethiol was added while dropping in at about the same rate from the other dropping funnel 85 parts of nitric acid of specific gravity 1.42. After all the contents of the reaction mixture had been added and the vigorous evolution of fumes of nitrogen oxides had ceased, the product was evaporated on the steam bath using a current of air to assist in the removal of the vapors of carbon tetrachloride. The aqueous solution was neutralized with 16 parts of sodium hydroxide in 100 parts of water. The brownish colored aqueous solution was extracted with ethyl ether, the ether solution was treated with bone black, filtered, dried with sodium sulphate, filtered and the ether evaporated. Eighty-one parts of a brownish colored solid was obtained which analyzed 7.8% sulphur, indicating a purity of 83.5% of sodium 3,9-diethyl - 6 - tridecanesulphonate. Dilute aqueous solutions of sodium 3,9-diethyl-6-tridecanesulphonate wet skeins of cotton thread rapidly when tested by the method of Draves and Clarkson (American Dyestuffs Reporter 20, 201 (1931)).

EXAMPLE 2

*Sodium 9-heptadecanesulphonate*

Eighty-six parts of sodium 9-heptadecylsulphate, 150 parts of sodium sulphite, 470 parts of water, 2 parts of aniline and 2 parts of sodium dihydrogen phosphate are charged into an autoclave and heated with stirring for 16 hours at 130–140° C. The product consists of two layers, an upper oily layer and a lower water layer. The oily layer is mixed with water and methanol, made alkaline and extracted with petroleum ether to remove water-insoluble products. The extracted solution is evaporated to dryness. Aqueous solutions of sodium 9-heptadecanesulphonate wet skeins of cotton thread rapidly.

EXAMPLE 3

*Sodium 6-heptadecanesulphonate*

Sodium 6-heptadecylsulphate prepared by the sulphation of heptadecanol-6 by means of chlorosulphonic acid followed by neutralization with sodium hydroxide solution is reacted with sodium sulphite under the conditions described in Example 2. The product is isolated as described for the product of Example 2. Sodium 6-heptadecanesulphonate promotes the wetting by water of coton fibers.

EXAMPLE 4

*Sodium 9-heptadecanesulphonate*

Five hundred forty parts of concentrated nitric acid of specific gravity 1.42 are placed in a flask equipped with a stirrer, thermometer and dropping funnel. The nitric acid is heated and stirred to 60–70° C. and a small amount of 9-heptadecanethiol is added. After stirring for about five minutes reaction sets in and brown fumes are given off. Two hundred seventy-two parts of 9-heptadecanethiol is added slowly from the dropping funnel. After all the mercaptan is added the temperature is raised to that of the steam bath and heating is continued until brown fumes are no longer given off. Three thousand seven hundred fifty parts of water is added next, and the solution is neutralized with 20% aqueous sodium hydroxide solution. The water solution is next extracted with ethyl ether, and the ether is then evaporated. The residue is sodium 9-heptadecanesulphonate.

In the preparation of the sulphonates of the present invention I may employ any secondary mercaptan of 17 carbon atoms wherein the sulphhydro group is attached to a carbon atom other than a terminal carbon atom. I may use, for example, the following mercaptans: 9-heptadecanethiol, 8-heptadecanethiol, 7-heptadecanethiol, 6-heptadecanethiol, 5-heptadecanethiol, 4-heptadecanethiol, 3-heptadecanethiol, 2-heptadecanethiol, 5-ethyl-6-pentadecanethiol, 3-ethyl-4-pentadecanethiol, 3,9-diethyl-6-tridecanethiol, 5-ethyl-8-pentadecanethiol, 2,4,10,12-tetramethyl-7-tridecanethiol, 3-ethyl-6-pentadecanethiol, 2-methyl-5-hexadecanethiol, 3,7-dimethyl-10-pentadecanethiol, etc. Sodium 3,9-diethyl-6-tridecanesulphonate is the preferred product.

I may employ any mixture of secondary mercaptans containing 17 carbon atoms with the sulphhydro group attached to a carbon atom other than a terminal carbon atom as intermediates for conversion to the sulphonates. I may also employ the corresponding disulphides obtainable from the aforementioned mercaptans or mixtures of these disulphides and mercaptans.

The capillary active products of this invention are preferably obtained by treating a secondary mercaptan of 17 carbon atoms wherein the sulphhydro group is attached to a carbon atom other than the terminal carbon atom with an oxidizing agent such as nitric acid, potassium permanganate, hydrogen peroxide, potassium dichromate, air, etc. If desired the oxidation may be carried out in the presence of an oxidation catalyst such as vanadium pentoxide or vanadium salts. Another suitable method is the reaction of an alkyl halide such as 7-bromoheptadecane or an alkyl sodium sulphate as, for example, sodium 6-heptadecylsulphate with sodium sulphite. Less preferred methods for the preparation of the sulphonates are the oxidation of thiosulphuric acid esters, the treatment of a suitable secondary alcohol with methane disulphonic acid or a secondary olefin with a strong sulphonating agent such as concentrated sulphuric acid at temperatures above 100° C.

In carrying out the oxidation of the mercaptans with nitric acid it is frequently desirable to employ an inert solvent such as carbon tetrachloride, trichloroethylene, etc. It is sometimes necessary to initiate the reaction by the addition of a small amount of fuming nitric acid and warming to about 75° C. Reaction is indicated by the vigorous evolution of fumes of the oxides of nitrogen. It is frequently desirable to oxidize a small amount of the mercaptan with a small amount of nitric acid, and then after reaction has started to add additional quantities of mercaptan and nitric acid slowly to the reaction mixture. While temperatures ranging from 0° C. to 100° C. have been used for the nitric acid oxidation, I may carry out the reaction below 0° C. and above 100° C. However, I prefer to use temperatures of about 40–75° C. At low temperatures the reaction becomes sluggish, while at high temperatures the reaction is difficult to control.

The secondary monosulphonic acids described herein may be used as such, but generally they are converted to their alkali metal salts by neutralization with an alkali metal hydroxide such as sodium hydroxide. The potassium, ammonium, calcium, and magnesium salts may also be prepared and used. Suitable salts of secondary sulphonic acids described herein may also be made from such amines as dimethylamine, ethylamine, diethanolamine, triethanolamine, tetramethylammonium hydroxide, butylamine, glucamine, methyl glucamine, pyridine, piperidine, cyclohexylamine, aniline, toluidine, etc. In this application when I mention a secondary alkyl monosulphonate I intend to refer generically to the sulphonate irrespective of how or whether the acid hydrogen of the sulphonic group may have been neutralized.

The new compositions covered in this case belong to the class of surface active or capillary active materials in that they have colloidal properties and may, therefore, be advantageously used in any process involving wetting, penetrating, deterging, dispersing, emulsifying, frothing, foaming and kindred phenomena. These compositions may be employed in pure or standardized form, and, if desired, in conjunction with known processing or treating agents. They may be used by themselves or in combination with other surface active agents in any relation in which surface active agents having colloidal properties have heretofore been used. Since the products of this invention have surface tension lowering properties, they may be utilized in many of the technical applications of surface active compounds which are described in an application of Downing and Johnson, Serial Number 200,530, filed April 6, 1938.

The above description and examples are to be taken as illustrative only. Any variation or departure therefrom which conforms to the spirit of the invention is intended to be included within the scope of the claims.

I claim:
1. Secondary alkyl monosulphonates containing 17 carbon atoms having the general formula

in which R and R' are saturated aliphatic hydrocarbon radicals and X represents a sulphonate group selected from the class consisting of sulphonic acid and sulphonate salt groups.
2. A 3,9-diethyl-6-tridecanesulphonate salt.
3. A 9-heptadecanesulphonate salt.
4. Sodium 3,9-diethyl-6-tridecanesulphonate.
5. A 7-heptadecanesulphonate salt.

JAMES HERBERT WERNTZ.